Patented Apr. 24, 1951

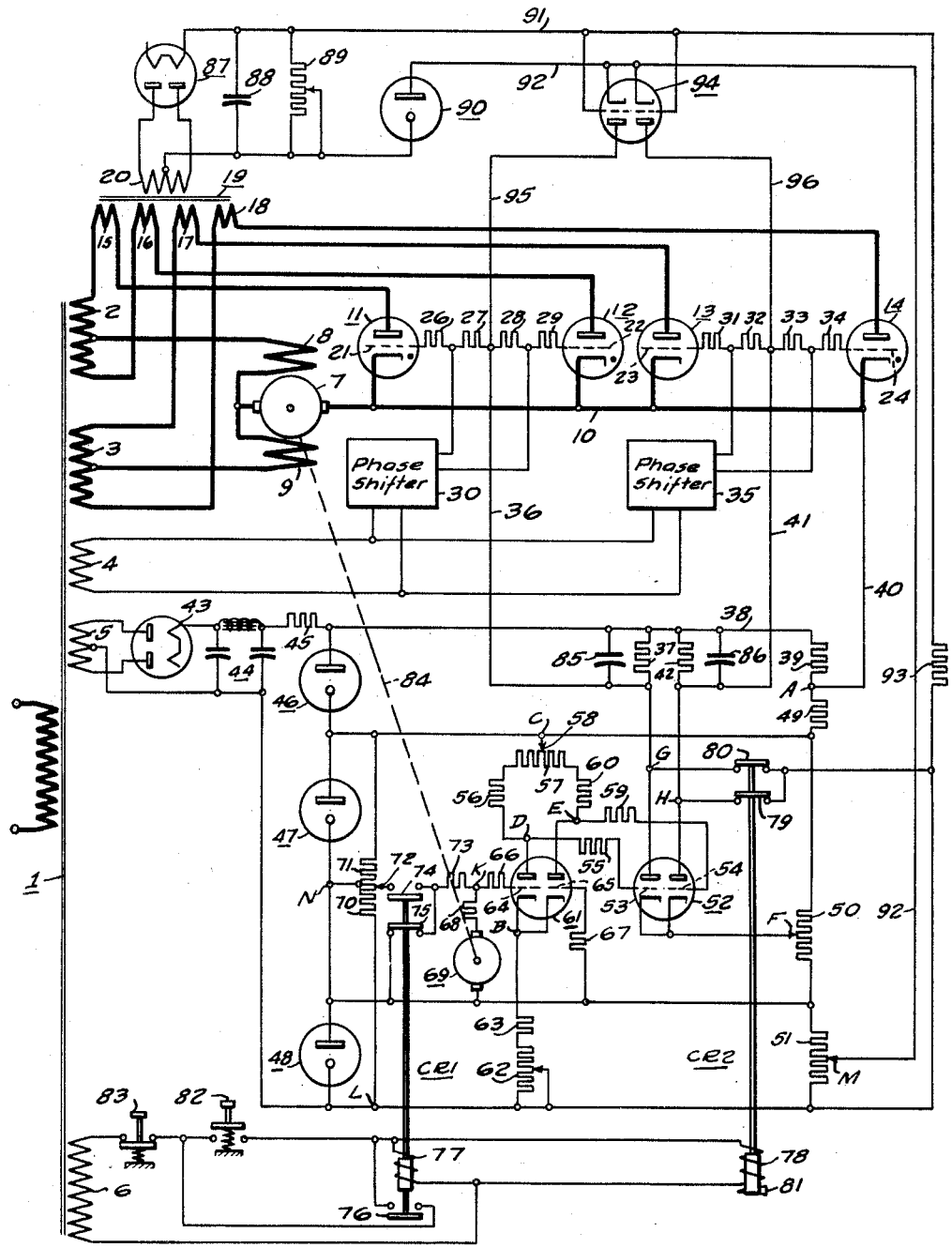

2,550,105

UNITED STATES PATENT OFFICE 2,550,105

ELECTRONIC MOTOR CONTROL SYSTEM

Walter W. Cotner, Ithaca, N. Y., assignor to Westinghouse Electric Corporation, East Pittsburgh, Pa., a corporation of Pennsylvania Application August 10, 1948, Serial No. 43,447

13 Claims. (Cl. 318—345)

My invention relates to electronic motor control systems and particularly to systems for operating a direct-current motor from an alternating-current source so as to run at a controllable and regulated speed.

It is an object of my invention to devise a system of the type mentioned that provides for regenerative or negative torque operation of the controlled motor with the aid of much simpler rectifying and associated electronic devices than were heretofore needed for systems of comparable performance.

Another object of the invention is to devise such a system so that the motor, when to be stopped, is subjected to regenerative braking.

Still another object of the invention is the provision of simplified yet reliable current limiting means for controlling the acceleration of the motor.

These and other objects as well as the means for achieving them will be apparent from the following description in conjunction with the drawing which shows, by way of example, a circuit diagram of a system for controlling a reversible motor energized by rectified current from an alternating-current supply.

In the following description of the illustrated embodiment, parenthetical references are given to commercial-type designations of electronic tubes and numerical values of voltage, resistance and capacitance magnitudes. These references are mainly intended to exemplify applicable devices and orders of magnitude and are presented merely by way of illustration. It is obvious that tubes of other designation and impedance elements of other numerical magnitudes may be employed depending upon the requirements or desiderata of each particular application.

The illustrated system is energized from an alternating-current line through a power supply transformer 1 with secondary windings 2, 3, 4, 5 and 6, although several individual transformers may be used instead of the one shown in the drawing.

The motor to be controlled has its armature 7 connected with two series field windings 8 and 9 so that the torque of the motor has a direction dependent upon which of the two field windings is energized or more strongly energized than the other at a time. Field winding 8 is connected to a mid tap of the secondary winding 2. Field winding 9 is connected to a mid tap of secondary 3. The motor is supplied from the secondaries 2 and 3 by current which is rectified by controllable rectifier tubes 11, 12, 13 and 14. These tubes are of the arc-discharge type and are exemplified by thyratrons (type WL-672). The cathodes of all rectifier tubes are connected to a common lead 10 which is attached to the armature 7. The plates of tubes 11 and 12 are connected to the respective end points of the secondary 2 and, therefore, when conductive, energize the field winding 8 in series with the armature 7. The plates of tubes 13 and 14 are connected with the respective end points of secondary 3 so that the field winding 9 is energized in series with the armature 7 when tubes 13 and 14 are conductive. Each pair of tubes 11, 12 and 13, 14 is connected and operated as a full-wave rectifier. The plate connections of the four tubes include the respective primaries 15, 16, 17 and 18 of a current transformer 19 whose secondary winding is denoted by 20. The purpose of the current transformer 19 will be explained in a later place.

The rectifier tubes, for simplified illustration, are represented as triodes although tetrodes or pentodes may be used if desired. The control grids the the four rectifier tubes are denoted by 21, 22, 23 and 24, respectively.

Grids 21 and 22 are interconnected through series-connected resistors 26 (220,000 ohms), 27 (10,000 ohms), 28 (10,000 ohms) and 29 (220,000 ohms). An alternating component grid voltage is impressed across resistors 27 and 28 through a phase-shift circuit 30 which may have any of the available suitable designs and is connected across the secondary winding 4. In this manner both tubes 11 and 12 are provided with an alternating grid bias which has a fixed phase relation, for instance about 90° or about 120° phase lag, relative to the anode voltage of the tubes.

The control grids 23 and 24 of tubes 13 and 14 are interconnected by series-connected resistors 31, 32, 33 and 34 (same ratings as respective resistors 26, 27, 28, 29). An alternating component grid voltage of a fixed phase displacement relative to the anode voltage of the tubes is impressed across resistors 32 and 33 by means of a phase shifter 35 which is also attached to the secondary winding 4. The phase displacement of the alternating grid bias for tubes 13 and 14 has preferably the same magnitude as that for tubes 11 and 12.

The control circuit for tubes 11 and 12 extends from the mid points between resistors 27 and 28 through a lead 36, a resistor 37 (150,000 ohms), a lead 38, a resistor 39 (10,000 ohms), and a lead 40 to the common cathode conductor 10 of the motor circuit. The control circuit for tubes 13 and 14 extends from a point between resistors 32 and 33 through a lead 41, a resistor 42 (150,000 ohms), lead 38, resistor 39, and lead 40 to the common cathode and armature conductor 10.

In addition to the above-mentioned source of an alternating and dephased grid bias, each of the two control circuits for the rectifier tubes includes two additional sources of component grid voltage. In the control circuit for tubes 11 and 12 these additional sources are represented by resistor 39 and resistor 37. Resistor 39 is impressed by a unidirectional grid bias voltage of constant magnitude, and resistor 37 is impressed by a unidirectional grid voltage of variable magnitude. The constant grid bias from across resistor 39 combines with the above-mentioned alternating bias so as to provide a periodical and dephased bias of a fixed characteristic. The variable grid voltage from across resistor 37 has the effect of shifting the periodic bias so as to displace the firing point of tubes 11 and 13, i. e., the phase position of the instant at which tubes 11 and 12 become conductive during the respective positive half-wave periods of their respective anode voltages. Therefore the magnitude of rectified voltage and current supplied through tubes 11 and 12 to the motor depends upon the magnitude of the variable voltage across the resistor 37.

The resistor 39, as explained above, lies also in the control circuit for the tube pair 13, 14 and hence provides a constant bias voltage for this circuit. The resistor 42 represents a source of variable grid voltage for the control circuit of tubes 13 and 14. Consequently, the magnitude of the rectified voltage and current supplied to the field winding 9 and the armature 7 of the motor through tubes 13 and 14 depends upon the magnitude of the variable voltage across resistor 42.

It will now be explained how the constant grid bias is impressed across the above-mentioned resistor 39, common to the control circuits of both tube paths. Connected to the secondary 5 of the transformer 1 is a rectifier 43 (type 5Y3) whose output voltage (375 volts) is impressed through a filter circuit 44 and through a series resistor 45 (5,000 ohms) across a potentiometric circuit. This circuit includes three voltage regulating tubes 46, 47 and 48 which are preferably of the cold-cathode type (VR 105/30).

The voltage drop across such tubes is constant (105 volts) so that any variation in the magnitude of the rectified voltage from rectifier 43 is absorbed in the series resistor 45. The above-mentioned resistor 39 is connected in series with a resistor 49 (20,000 ohms) across the tube 46, and thus forms part of the potentiometric arrangement. Consequently, the voltage drop across resistor 39 is constant and its magnitude (70 volts) is determined by the relative resistance values of resistors 39 and 49. In other words, by properly selecting the resistance or voltage point A, the desired constant grid bias voltage for the two rectifier pairs can be properly adjusted. The above-mentioned potentiometric arrangement also includes a rheostat 50 (25,000 ohms) across tube 47 and a rheostat 51 (25,000 ohms) across tube 48.

The above-mentioned variable voltage across resistor 37 in the control circuit for tubes 11, 12, and the variable voltage across resistor 42 in the control circuit for tubes 13, 14 are provided by means of a push-pull amplifier which will be described presently. A twin vacuum tube 52 (6SL7) has its two anodes so connected to the resistors 37 and 42 that these resistors represent a load in the two respective plate circuits of the tube. The two plate circuits are energized by constant voltage of adjusted magnitude from across the series-connected potentiometric resistors 39 and 49 and the tapped off portion of rheostat 50. It will be recognized that when either section of tube 52 is conductive, the plate current impresses a voltage drop across resistor 37 or 42. This voltage drops depends upon the degree of conductance of the respective tube sections which in turn is controlled by the voltage conditions in the appertaining grid circuits.

The control grid of tube 52 for controlling the variable voltage drop across resistor 36 is denoted by 53 and the grid for controlling the voltage across resistor 42 is denoted by 54. Grid 53 is connected through resistors 55 (220,000 ohms), 56 (10,000 ohms), a portion of a rheostat 57 (25,000 ohms), and an appertaining tap or slide contact 58 with the tapped-off portion of rheostat 50 whose slider is connected to the cathodes of tube 52. The grid circuit for grid 54 extends through resistors 59 (220,000 ohms), 60 (10,000 ohms) and the other portion of rheostat 57 to the tap or slide contact 58, and thence through the tapped-off portion of rheostat 50 to the cathodes of tube 52.

It will be recognized that the two grid circuits for tube 52 are impressed by an adjusted constant grid bias from across the tapped-off portion of rheostat 50. The resistor 56 and the adjacent portion of the rheostat 57 represent another source of grid voltage for the circuit or grid 53. This other source provides a variable component bias which determines the conductivity of the tube section appertaining to grid 53. Similarly, the resistor 60 and the adjacent portion of rheostat 57 represent a source of variable grid voltage in the circuit of grid 54.

The occurrence of a variable voltage across resistor 56 and the adjacent portion of rheostat 57 is due to the fact that this resistance path is connected as a load in one of the plate circuits of another twin vacuum tube 61 (6SL7). Similarly, the resistor 60 and the adjacent portion of rheostat 57 lie in the other plate circuit of the tube 61.

Both plate circuits of tube 61 are energized by constant voltage from across the series-connected rheostats 50 and 51 and include a bias adjusting rheostat 62 (25,000 ohms) and a resistor 63 (100,000 ohms). The appertaining two control grids are denoted by 64 and 65. Attached to the grids are respective resistors 66 and 67 (each 220,000 ohms). These resistors are interconnected by a resistor 68 (75,000 ohms) and a tachometer generator 69. Connected across tubes 47 and 48 are hence also across rheostats 50 and 51, is a speed control rheostat 70 (50,000 ohms). This rheostat has a tap 71 attached to a point between tubes 47 and 48, and hence to the resistor 67. Rheostat 70 is further equipped with a displaceable slide contact or tap 72 whose position determines the direction and magnitude of the torque to be developed by the motor. Tap 72 is connected to a point between resistors 66 and 68, through a resistor 73 (100,000 ohms) and under control by a normally opened contact 74 of a relay CR1. Relay CR1 has two additional contacts 75 and 76 controlled by a coil 77.

The circuit for coil 77 is connected with the coil 78 of a relay CR2 which has two contacts 79 and 80 and is designed as a timing relay, this being schematically indicated by a short-circuited winding 81, although other types of timing devices may be used. The coil circuits for relay CR1 and CR2 are energized from the transformer secondary 6 under control by a normally open start contact 82 and a normally closed stop contact 83. When the transformer 1 is energized, the actuation of contact 82 causes relays CR1 and CR2 to pick up. Both relays then remain in picked-up condition due to the closing of a self-sealing circuit at contact 76. When thereafter the stop contact 83 is depressed, relay CR1 drops out immediately while relay CR2 follows after the elapse of its timing period. When the relays are picked up, the motor is energized to run under speed-torque conditions which are adjusted by means of the slider 72 in rheostat 70 and regulated by the tachometer generator 69.

The generator 69 provides a reversible voltage whose polarity and magnitude depend upon the running direction and speed of the generator. The generator is mechanically coupled with the motor armature 7 or with a part or machinery to be driven by the motor. The dependence of the generator operation upon that of the motor is schematically represented by a broken connecting line 84.

Capacitors 85 and 86 (each 0.5 mfd.) are connected across resistors 37 and 42 respectively for start control purposes explained in a later place.

Reverting now to the above-mentioned current transformer, it will be recognized that the voltage across its secondary 20 is proportional to the load current of the motor. This current-responsive voltage is rectified by a rectifier 87 (6x5) whose output voltage is impressed across a filtering capacitor 88 (1 mfd.) and a rheostat 89 (10,000 ohms). A cold-cathode tube 90 (VR 105/30) of a given breakdown voltage (105 volts) is series-connected with the rectifier output leads 91 and 92 which are connected across a tapped-off portion of rheostat 51, a resistor 93 (15,000 ohms) being inserted between lead 91 and rheostat 51. A controllable twin vacuum tube 94 (6SN7) has its cathodes connected to lead 91 and its grids connected to lead 92 while the respective anodes are connected to those of tube 52 through leads 95 and 96 respectively.

The system operates in the following manner.

Basic operation

As mentioned, the selected setting of the contact 72 of rheostat 70 controls the direction and speed of rotation of the motor. When contact 72 is at the mid point, each grid of tube 61 is at the same potential with respect to the cathode point B of tube 61. Then, by means of the movable contact 58 of potentiometer rheostats 57 (point C), the voltage drop from point C to point D can be made the same as the voltage drop from C to E. Thus D and E are at the same potential with respect to point F at rheostat 50. When D and E are at the same potential, A is at a positive potential with respect to G and H so that the rectifier tubes 11, 12, 13, 14 are biased to cutoff, if rheostat 62 is correspondingly adjusted. If the rectifier tubes are not biased to cutoff, the two series field windings 8 and 9 will carry equal currents. The fields of windings 8 and 9 then cancel each other so that, while the armature current is the sum of the field currents, there is no torque produced and the armature does not rotate. This condition of no rotation may be called the "quiescent" setting of the tap 72 on control rheostat 70. Whether the tubes 11, 12, 13 and 14 are biased to cutoff or not, at the quiescent setting of rheostat 70 depends on the operating characteristics desired. Biasing the rectifier tubes at less than cutoff makes for a "sharp" setting of tap 72 for "zero speed." Biasing at cutoff or more than cutoff gives "width" to the zero speed or quiescent setting of tap 72.

Now, assume that tap 72 is moved nearer, electrically, to point N. Then point K is at a more positive potential with respect to point B and therefore point D becomes more negative with respect to point C. Also point D is more negative than point E with respect to point F. Consequently, resistor 37 carries less current and point G becomes less negative, i. e., more positive, with respect to point A. Thus the firing angle of tubes 13 and 14 is changed so that series field 8 carries more current than series field winding 9. Therefore series field 8 now controls the direction of torque.

In a similar manner, a displacement of tap 72 on control rheostat 70 toward point L has the opposite effect so that then the field winding 8 controls the torque direction.

If the circuit is so adjusted that both fields are carrying current at the quiescent setting (zero speed), a displacement of tap 72 from the quiescent setting will increase the current in one field and reduce the current in the other field. This adjustment can be obtained by correspondingly setting the rheostats 62 and 50. The control will then be "sharp" to any movement of tap 72, and the motor will be "stiff" to any torque applied by the load at zero speed.

Speed control

The magnitude of the speed reference voltage is determined by the setting of the tap point 72 on potentiometer 70. The tachometer generator 69 generates a direct-current voltage proportional to its speed. The tachometer voltage combines with the reference voltage so as to tend to bring about quiescent conditions in the amplifier circuit. But quiescent conditions in the amplifier result in equal or no field currents in the motor field windings, i. e. in the disappearance of torque. Thus the magnitude of the torque, within the limits of the circuit parameters, is determined by the difference between the reference voltage and the tachometer voltage. When the motor is running under a given load and at the correct speed, this voltage difference is just that needed to maintain the motor speed at that load. If the motor speed drops, for instance, due to a load variation, the tachometer voltage drops also and its difference from the reference voltage becomes larger. As a result, the phase angle of the rectifier firing points is shifted to the extent needed to return the motor speed to the correct value. Conversely, if the motor speed increases beyond the correct value, the difference voltage becomes smaller and may even reverse its polarity so that the firing points are shifted in the reverse direction thus reducing or reversing the motor torque until the correct speed is re-established. In this manner, the system regulates itself for constant speed in accordance with the desired speed value set at control rheostat 70. This torque and speed control is effective for either direction of rotation.

Current limit and acceleration control

As mentioned, the rectified voltage across rheostat 89 is substantially proportional to the load current of the motor. During steady-state operation of the motor, this voltage remains below the value at which the tube 90 becomes conductive. Consequently, the rectified current-responsive voltage is normally without effect on the above-described speed and torque controlling performance. However, when during starting, accelerating or overload periods the motor current exceeds a predetermined value, the voltage across tube 90 reaches the breakdown value. Tube 90 then conducts current through lead 92, resistor 93, a portion of rheostat 51, and lead 91. This current makes lead 91 more positive with respect to tap point M of rheostat 51. Thus tube 94, which is normally biased to complete or approximate cutoff by the setting of point M, becomes conductive and draws current through resistors 37 and 42. As a result, points G and H become more negative with respect to point A and change the firing angle of the rectifier tubes to reduce the conducting intervals and the resulting motor current. This current-limiting effect limits the maximum load to which the rectifiers may be subjected and also controls the acceleration of the motor in accordance with a desired starting, speed-change, or reversing performance.

*Starting and stopping*

When transformer 1 is energized but the motor is at rest, both relays CR1 and CR2 being dropped out, the capacitors 85 and 86 are charged through closed contacts 79 and 80 from across the potentiometer resistors 39, 49, 50, 51.

When the motor is started by actuating the start contact 82, thus causing the relays CR1 and CR2 to pick up, while tap 72 of speed control rheostat 70 is set to a point away from the quiescent setting, the control system causes acceleration of the motor up to the preset speed substantially as explained above. However, the change of voltage across the resistors 37 and 42 is at first largely absorbed by the flow of discharge current from the parallel capacitors 85 and 86. In this manner, a sudden change in voltage and a corresponding sudden advance of the rectifier firing points is prevented thus eliminating or cushioning the otherwise disturbing effects of the initial peaks of starting current. This current limiting function lasts a few cycle periods and permits the motor current to build up gradually until the previously described current limiting means assume operation.

When the motor is stopped by actuation of the stop contact 83, relay CR1 drops out immediately while relay CR2 stays picked up for an additional interval of time. During that interval, the rheostat tap 72 is disconnected from the grid circuits of tube 61 and the tachometer 69 is connected through contact 75 so that its voltage is alone effective to bias the grid circuits for reversed motor torque. That is, while the motor is still running in the previous direction, the field winding for reversed torque is now predominantly energized. The motor operates regeneratively and feeds energy back into the alternating-current line through one of the rectifier pairs which now operates as an inverter. Consequently, during the first-mentioned interval, the motor does not merely coast to low speed but is forcibly decelerated by regenerative braking.

The subsequent dropping out of relay CR2 has the effect of connecting the rectifier control circuits to the negative end of the potentiometric network. This makes the rectifier grids negative with respect to the cathode lead 10 by the amount of the voltage drop in resistors 49, 50, 51 and 93 and stops the conduction of all rectifier tubes 11, 12, 13, 14.

It will be understood from the foregoing that relays CR1 and CR2 need not necessarily be interconnected in the illustrated manner. If desired, separately operable braking and stopping switches may be used instead of respective relays CR1 and CR2.

The motor can also be stopped by moving the tap 72 of control rheostat 70 to the quiescent point.

During deceleration, due to actuation of the stop contact or due to displacement of the control rheostat tap point, the motor load current remains under the current-limit control described previously.

*Reversing and negative torque operation*

Reference was made in the foregoing description of speed control and braking performance to the occurrence of reversed torque and regenerative operation of the motor. It should be understood that such a regenerative or negative torque will occur whenever the motor is subjected to overhauling load and that the system will automatically adjust itself to have the discharge tubes 11, 12 or 13, 14 operate as inverters during the periods of such load conditions. This will be more fully understood from the following.

The motor can be reversed by moving the tap 72 of control rheostat 70 from one to the other side of the quiescent point. When this is done while the motor is running, the motor will at first continue to run in the same direction although now the field winding for reversed run is predominantly energized. As a result, the motor load is at first overhauling, i. e. the motor torque is negative and the polarity of the motor terminals relative to that of the predominantly effective rectifier tubes is reversed so that the motor, operating as a generator, feeds energy back into the alternating-current line and is braked regeneratively until its speed passes through zero. Thereafter, the motor accelerates in the opposite direction up to the speed determined by the new setting of the control rheostat.

A similar temporarily regenerative operation may, of course, also occur if the speed control rheostat is moved from a higher to a lower speed point for the same running direction. If the change in setting is sudden or large enough, the tachometer voltage may become larger than the reference voltage. Therefore, the opposite motor field from the one producing the positive torque becomes predominant and regeneration will occur if the speed-load conditions are appropriate.

If the motor, when operating, overspeeds, the effect on the rectifier control circuits is the same as if tap 72 of control rheostat 70 was moved toward the opposite side of the quiescent point. Consequently, the tachometer voltage may become larger than the reference voltage and regeneration may occur in substantially the same manner as mentioned in the preceding paragraph.

Reviewing the system as a whole, it will be recognized that it requires only two full-wave rectifiers for performing all above-mentioned functions as compared with the three halves of rectifiers heretofore necessary for regeneratively operating systems. Of course, for lesser requirements the full-wave rectifiers may be replaced by half-wave rectifiers preferably with follower tubes. On the other hand, for high power requirements a three-phase or multi-phase rectifier may be employed instead of each illustrated full-wave rectifier. It will be recognized that any such modified rectifier arrangement is simpler and requires a smaller number of tubes than the known systems of comparable rectifier design. It should be understood that while thyratrons are shown in the drawing, a system according to the invention permits also the use of ignitrons.

It will also be noted that all rectifier tubes for supplying current to the motor have their respective cathodes connected to one and the same conductor. As a result the necessary grid or control circuits are considerably simplified in comparison with the known regenerative control systems. For instance in the illustrated system, only two control circuits and two appertaining phase-shift circuits are needed. As a further result the accessory equipment, in particular the appertaining amplifier tubes, are reduced in number and require a correspondingly reduced amount of circuit components.

Referring to the illustrated amplifier, the two tubes 52 and 61 and the associated circuits would be recognized to represent two consecutive stages of amplification. Obviously for reduced output requirements, a single stage may be sufficient; while on the other hand, one or more additional amplifying stages may be added if desired. The particular push-pull amplifier shown on the drawing is a modification of the one disclosed in the copending application, Serial No. 761,521, filed July 17, 1947, now Patent No. 2,504,877, of William O. Osbon, and assigned to the assignee of the present invention. Similar amplifiers are also disclosed in my copending application, Serial No. 43,446, filed August 10, 1948, now Patent No. 2,530,949, dated November 21, 1950, and entitled Electronic System for Energizing Direct-Current Motors From an Alternating Current Supply, and in the copending application of Walter G. Roman, filed August 10, 1948, Serial No. 43,414, now Patent No. 2,530,993, November 21, 1950, and entitled Electronic Control System for Direct Current Motors, both also assigned to the assignee of the present invention. It should be understood, however, that the invention, as regards some of its aspects, can also be carried out with the aid of amplifiers of other available types.

It thus will be apparent that the invention is not limited to the specific features and details of the illustrated embodiment, but can be modified and altered in various respects without departing from the essence of the invention and within the scope of the claims annexed hereto.

I claim as my invention:

1. An electric drive control system, comprising a direct-current motor having an armature and two split field series windings, a power supply transformer having two windings each having two end points and having an intermediate tap point connected to one of said field windings respectively, two pairs of rectifier tubes having a common cathode lead connected to said armature so that all said tubes have the same cathode potential, each pair having anode leads connected to said respective end points of one of said respective transformer windings, control circuits for said respective tube pairs, and adjustable control means with which said control circuits are associated in mutually inverse relation so that a change in adjustment of said control means causes increased conductance of one pair while the conductance of the other pair is reduced.

2. An electronic control system for a split-field series motor, comprising an energizing circuit having an armature lead and two field leads, a power supply transformer having two windings each having two end points and having an intermediate tap point connected to one of said field windings respectively, two pairs of rectifier tubes having respective cathodes all directly connected with said armature lead so that all tubes have the same cathode potential, each pair having anodes connected to the two end points of said respective transformer windings, said two pairs having respective control circuits, and control means with which said control circuits are associated in inverse relation to each other so that a change in condition of said control means increases the conductance of either pair while reducing the conductance of the other.

3. An electric drive, comprising a direct-current motor having an armature and two split field series windings, alternating-current supply means, two controllable thyratron rectifiers connected with said supply means and disposed between said armature and said respective windings, said rectifiers having respective grid circuits and control means connected with said grid circuits to cause increased conductance of either rectifier to be accompanied by reduced conductance of the other, said control means comprising respective resistors series-connected in said grid circuits and a push-pull amplifier having two output circuits extending through said respective resistors to impress variable voltage drops thereon, said amplifier having an input circuit with variable voltage means for controlling said voltage drops in inverse relation to each other.

4. An electric drive, comprising a direct-current motor having an armature and two split field series windings, alternating-current supply means, two controllable rectifiers connected with said supply means and disposed between said armature and said respective windings, said rectifiers having respective control circuits and control means connected with said control circuits to cause increased conductance of either rectifier to be accompanied by reduced conductance of the other, said control means comprising respective resistors series-connected in said control circuits and a push-pull amplifier having two output circuits extending through said respective resistors to impress variable voltage drops thereon, said amplifier having an input circuit with variable voltage means for controlling said voltage drops in inverse relation to each other, current-responsive voltage supply means connected with said armature to provide a voltage substantially proportional to the motor current, and twin tube means having two grid circuits connected to said voltage supply means and two plate circuits connected across said respective resistors to superimpose on said voltage drops a variation for limiting said motor current.

5. In an electric drive according to claim 4, said twin tube means having grid bias means disposed in said grid circuits so as to conduct only when said current exceeds a given overload value whereby said twin tube means remain non-conductive during steady-state operation of said motor.

6. In an electric drive according to claim 4, a voltage regulating tube of a given breakdown voltage series-connected between said voltage supply means and said twin tube means so as to conduct current through twin tube means only when said motor current exceeds a given value at which said regulating tube becomes conductive.

7. An electronic control system for an electric drive, comprising a motor armature circuit having alternating-current supply means and a discharge rectifier, said rectifier having a control circuit with variable voltage supply means for controlling the armature current, current-responsive voltage supply means connected with said armature circuit to provide a voltage substantially proportional to said current, a control tube having a grid circuit connected with said voltage supply means and having a plate circuit connected with said control circuit, and a voltage regulating tube of a given breakdown voltage series-connected in said grid circuit to cause said control tube to control said rectifier for limiting said armature current when said current reaches a given overload value at which said regulating tube becomes conductive.

8. An electronic control system for an electric drive, comprising a motor circuit having alternating-current supply means and two discharge rectifiers of mutually inverse polarity of connection to said supply means, said rectifiers having respective control circuits each comprising a series resistor, control means having a source of control voltage to which said control circuits are connected in inverse voltage relation to each other so as to increase the conductance of either rectifier when decreasing the conductance of the other, current-responsive voltage supply means connected with said motor circuit to provide a voltage substantially proportional to the current flowing in said motor circuit, twin tube means having two grid circuits connected to said voltage supply means and two plate circuits connected across said respective resistors to impress thereon respective voltages for limiting said motor current, and a voltage regulating tube of a given breakdown voltage series-connected between said voltage supply means and said twin tube means so as to render said twin tube means effective only when said motor current exceeds a given value at which said regulating tube becomes conductive.

9. An electronic control system for an electric drive, comprising a motor circuit having alternating-current supply means and a discharge rectifier having a control circuit with a series resistor, an amplifier having an output circuit extending through said resistor to impress thereon a control voltage for controlling the current flowing through said rectifier, said amplifier having an input circuit with variable voltage supply means for controlling said control voltage, and a capacitor connected across said resistor for delaying the change of said control voltage so as to limit said current during periods of rapid current change.

10. An electronic control system for an electric drive, comprising a motor circuit having alternating-current supply means and two discharge rectifiers of mutually inverse polarity of connection to said supply means, said rectifiers having respective control circuits each comprising a series resistor, control means having a source of control voltage to which said control circuits are connected in inverse voltage relation to each other so as to increase the conductance of either rectifier when decreasing the conductance of the other, and two capacitors connected across said respective resistors for retarding the response of said rectifiers to rapid changes of said control voltage in order to temporarily limit the motor current.

11. An electronic control system for an electric drive, comprising a motor circuit having alternating-current supply means and two discharge rectifiers of mutually inverse polarity of connection to said supply means, said rectifiers having respective control circuits, control voltage supply means to which said control circuits are connected in mutually inverse voltage relation, said voltage supply means comprising an adjustable source of speed reference voltage and a speed-responsive source of variable voltage connected in mutually opposed polarity relation to each other so as to substantially balance each other when the drive speed is in accordance with the adjusted reference voltage, and control means for disconnecting said reference voltage source so that then said speed-responsive source is alone effective in order to brake the motor by negative torque.

12. An electronic control system for an electric drive, comprising a motor circuit having alternating-current supply means and two discharge rectifiers of mutually inverse polarity of connection to said supply means, said rectifiers having respective control circuits, control voltage supply means to which said control circuits are connected in mutually inverse voltage relation, said voltage supply means comprising an adjustable source of speed reference voltage and a speed-responsive source of variable voltage connected in mutually opposed polarity relation to each other so as to substantially balance each other when the drive speed is in accordance with the adjusted reference voltage, operator-actuable first control means associated with said reference voltage source for disconnecting it when the motor is running so that then said speed-responsive source is alone effective in order to brake the motor by negative torque, and second control means connected with said control circuits for deenergizing said motor and connected with said first control means to operate a given time after the actuation of said first control means.

13. An electronic control system for an electric drive, comprising a motor circuit having alternating-current supply means and two discharge rectifiers of mutually inverse polarity of connection to said supply means, said rectifiers having respective control circuits, a push-pull amplifier having two output circuits connected with said control circuit to apply two inversely variable control voltages to said respective control circuits and having two input grid circuits, grid voltage supply means to which said grid circuits are connected in mutually inverse voltage relation, said voltage supply means comprising an adjustable source of speed reference voltage and a speed-responsive source of variable voltage connected in mutually opopsed polarity relation to each other so as to substantially balance each other when the drive speed is in accordance with the adjusted reference voltage, contact means disposed between said reference voltage source and said grid circuits for disconnecting said reference voltage source so that then said speed-responsive source is alone effective in order to brake the motor by negative torque, and condition-responsive control means associated with said control circuits for controlling said rectifiers to become non-conductive in dependence upon preceding actuation of said contact means.

WALTER W. COTNER.

REFERENCES CITED

The following references are of record in the file of this patent:

UNITED STATES PATENTS

| Number | Name | Date |
| --- | --- | --- |
| 2,276,752 | Willis | Mar. 17, 1942 |
| 2,421,632 | Livingston | June 3, 1947 |
| 2,431,578 | Moyer et al. | Nov. 25, 1947 |